United States Patent
Cho et al.

(10) Patent No.: US 7,789,936 B2
(45) Date of Patent: Sep. 7, 2010

(54) METHODS AND SYSTEMS FOR REMOVING COPPER FROM FERROUS SCRAP

(75) Inventors: Weol Dong Cho, Salt Lake City, UT (US); Peng Fan, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 574 days.

(21) Appl. No.: 10/568,845

(22) PCT Filed: Aug. 18, 2004

(86) PCT No.: PCT/US2004/026902

§ 371 (c)(1), (2), (4) Date: May 18, 2007

(87) PCT Pub. No.: WO2005/019481

PCT Pub. Date: Mar. 3, 2005

(65) Prior Publication Data

US 2007/0264151 A1    Nov. 15, 2007

Related U.S. Application Data

(60) Provisional application No. 60/495,930, filed on Aug. 18, 2003.

(51) Int. Cl.
*C22B 15/00* (2006.01)
*C22B 7/00* (2006.01)

(52) U.S. Cl. .............. 75/401; 75/403; 75/433; 75/638; 29/403.4

(58) Field of Classification Search ............... 29/403.1, 29/403.3, 403.4; 75/401–403, 414, 433, 75/638; 266/251, 252, 901; 423/23, 138, 423/604

See application file for complete search history.

(56) References Cited

U.S. PATENT DOCUMENTS

| | | | | |
|---|---|---|---|---|
| 3,669,644 A | * | 6/1972 | Sato | 75/347 |
| 4,290,809 A | * | 9/1981 | Loane, Jr. | 164/473 |
| 4,517,016 A | * | 5/1985 | Herter | 75/401 |

(Continued)

FOREIGN PATENT DOCUMENTS

JP        04-354831      * 12/1992

(Continued)

OTHER PUBLICATIONS

L. Savov et al., Copper and Tin in Steel Scrap Recycling, RMZ—Materials and Geoenvironment, vol. 50, No. 3, (Dec. 2003), pp. 627-640.*

English translation of JP 07-252545 to Takahashi et al., published Oct. 1995, 14 pages.*

English translation of JP 07-258760 to Tokumitsu et al., published Oct. 1995, 11 pages.*

(Continued)

*Primary Examiner*—George Wyszomierski
*Assistant Examiner*—Mark L Shevin
(74) *Attorney, Agent, or Firm*—Workman Nydegger (57) ABSTRACT

Methods and systems for removing copper from ferrous scrap are described. Some amounts of copper in ferrous scrap are removed by oxidation and subsequent mechanical impact of the oxidized scrap. Further removal of copper from the solid scrap can be achieved by fluxing the copper oxide below the melting point of ferrous scrap using $CaO-SiO_2-B_2O_3-$ and $Na_2O-SiO_2-B_2O_3$-based slags. Using the invention, copper can be removed from ferrous scrap in a natural, cost-effective, and environmental-friendly manner.

13 Claims, 8 Drawing Sheets

U.S. PATENT DOCUMENTS

| | | |
|---|---|---|
| 5,090,999 A | 2/1992 | Iwase |
| 5,387,273 A * | 2/1995 | Hartman et al. ............... 75/401 |
| 5,911,327 A | 6/1999 | Tanaka et al. |
| 6,368,380 B1 | 4/2002 | Kubota et al. |

FOREIGN PATENT DOCUMENTS

| | | |
|---|---|---|
| JP | 07-252545 | * 10/1995 |
| JP | 07-258760 | * 10/1995 |
| WO | WO 2005/019481 | 3/2005 |

OTHER PUBLICATIONS

English translation of JP 04-354831 to Katayama et al., published Dec. 1992, 20 pages.*

Cho et al., *High-Temperature Oxidation of Fe sub 3Al Containing Yitrium*, Journal of Materials Science, vol. 35, Published in 2000, No. 18, pp. 4695-4703.

Cho et al., *Diffusional Dissolution of Alumina in Various Steelmaking Slags*, ISIJ International, vol. 44, 2004, No. 2, pp. 229-234.

* cited by examiner

Figure 1. Weight change during the oxidation of steel and copper in 40%O₂ /Ar at 500 °C.

(a)

(b)

Figure 2. Copper (a) and steel (b) after oxidation in air at 700 °C.

Figure 3. Weight change of copper and steel during oxidation in air at 500 °C under thermal cycle.

Figure 4. Copper wire after oxidation in air at 700 °C.

Figure 5. CaO-SiO₂-B₂O₃ phase diagram.

Figure 6. (a) steel rod wound copper wire and (b) steel rod after dissolution of copper oxide.

METHODS AND SYSTEMS FOR REMOVING COPPER FROM FERROUS SCRAP

CROSS-REFERENCE TO RELATED APPLICATIONS

The application claims priority of PCT Application No. PCT/US04/026902, filed on Aug. 18, 2004, which claims priority of U.S. Provisional Application Ser. No. 60/495,930, filed 18 Aug. 2003, the entire disclosures of which are incorporated herein by reference.

FIELD OF THE INVENTION

The invention generally relates to methods and systems for increasing the purity of metals. In particular, the invention relates to methods and systems for increasing the purity of ferrous scrap. More particularly, this invention relates to methods and systems for removing copper impurities from ferrous scrap.

BACKGROUND OF THE INVENTION

In the process of manufacturing steel, iron and steel scrap is typically produced. The iron and steel scrap is an important material that can be used in high-quality steel and cast iron products and so the iron and steel scrap needs to be recycled. Unfortunately, much of the available iron and steel scrap, in particular those produced in automobile manufacturing, is contaminated with residual impurity elements such as copper and tin. Such impurities prevent the use of steel scrap directly for such higher-quality steel products.

Many impurities are commonly found in steel scrap. Of those impurities, copper (Cu) is typically cited as the most harmful because it can limit the end uses of the steel scrap. For example, excessive copper levels can cause problems in process that use the steel scrap, e.g., severe surface cracking during hot rolling (hot shortness), inhibit recrystallization during hot forming, and reduce ductility in deep drawing.

It is estimated that quality of steel scrap will deteriorate markedly over the next decade largely due to the increasing copper content. At the same time, the demand for high quality steel scrap will continue to increase. These trends are occurring because of the increased recycling and decreased production of home scrap. As well, the growth of electric arc furnace steelmaking and the decreasing quantities of home scrap in the major integrated producers have led to a greater demand for quality scrap and increased copper impurity levels. Further, with the ongoing acceleration of the production of sheet steel by minimills, high-grade scrap is likely to become scarcer and more expensive.

For these reasons, considerable effort has been made to develop a technology for the removal of copper from steel (or ferrous) scrap during the last decade. A number of technologies have been identified and attempted for the removal of copper from either ferrous scrap, whether in liquid or solid form.

Unfortunately, the best of these known processes for removal of copper (as well as Sb, As, Pb, and Zn) and Cu were those methods including selecting scrap and mechanical element cleaning. But such methods have several drawbacks, such as low efficiency and environmental concerns.

SUMMARY OF THE INVENTION

The invention provides methods and systems for removing copper from ferrous scrap. Some amounts of copper in ferrous scrap are removed by oxidation and subsequent mechanical impact of the oxidized scrap. Further removal of copper from the solid scrap can be achieved by fluxing the copper oxide using molten $CaO$—$SiO_2$—$B_2O_3$— and $Na_2O$—$SiO_2$—$B_2O_3$-based slags at temperatures below the melting point of ferrous scrap. Using the invention, copper can be removed from ferrous scrap in a natural, cost-effective, and environmental-friendly manner.

BRIEF DESCRIPTION OF THE DRAWINGS

The following description of the invention can be understood in light of FIGS. 1, 2a, 2b, 3-5, 6a, 6b, and 7-8 in which.

FIGS. 1, 2a, 2b, 3-5, 6a, 6b, and 7-8 illustrate specific aspects of the invention and are a part of the specification. Together with the following description, the Figures demonstrate and explain the principles of the invention. The Figures presented in conjunction with this description are views of only particular—rather than complete—portions of the invention. In the Figures, the physical dimensions may be exaggerated for clarity. The same reference numerals in different drawings represent the same element, and thus their descriptions will be omitted.

DETAILED DESCRIPTION OF THE INVENTION

The following description provides specific details in order to provide a thorough understanding of the invention. The skilled artisan, however, would understand that the invention can be practiced without employing these specific details. Indeed, the invention can be practiced by modifying the illustrated method and resulting product and can be used in conjunction with apparatus and techniques conventionally used in the industry.

Figure 7:
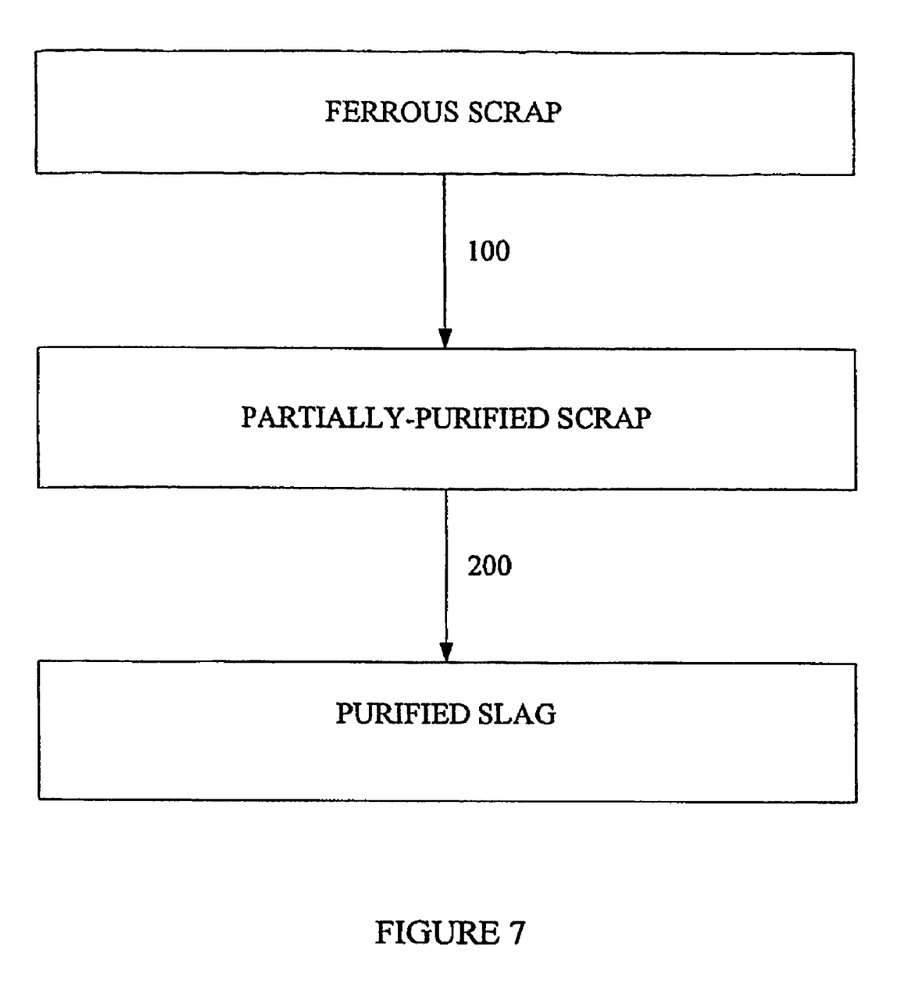
FIGS. 7 and 8 shows two aspects of the processes of the invention.

As described above, the invention includes methods for removing copper from ferrous scrap. The methods of the invention include a two step process as depicted in FIG. 7. The first step (100) produces a partially-purified scrap containing copper oxide from the ferrous scrap and removes a first amount of copper. The second step (200) further purifies the partially-purified scrap into a purified scrap by dissolving the copper oxide and thereby removes a second amount of copper. Any process which uses these two steps can be used in the invention, and including the processes described below.

The first and second amounts of copper that can be removed by the first and second steps depend on the amount of copper initially present, the duration of the processes, and the other operating parameters of the process. The amount of copper that can be removed in the second process can range from about 90 to less than 100 wt % (of the total copper). In one aspect of the invention, the amount of copper that can be removed in the second process can be from about 99.5 to about 99.95 wt % of the total copper.

Figure 8:
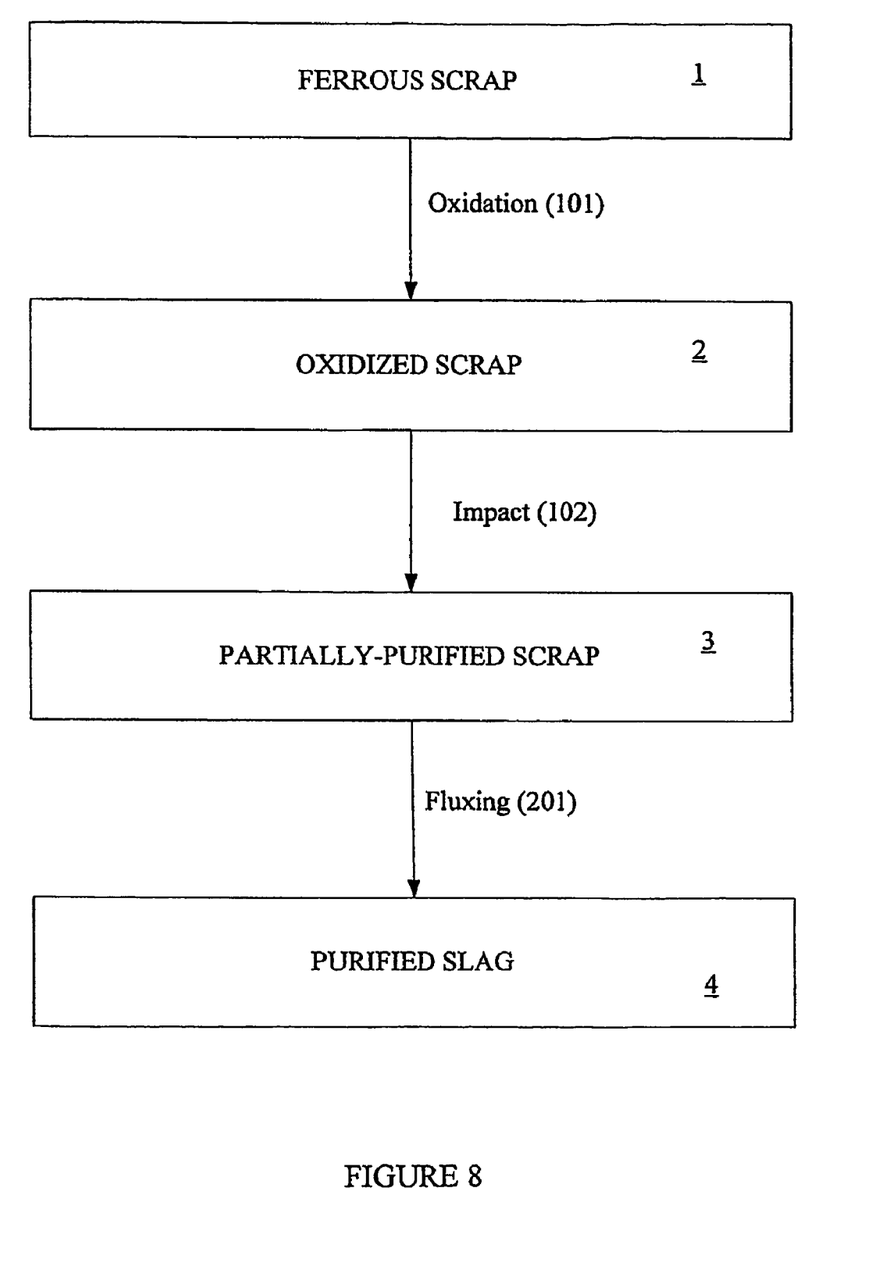

In one aspect of the invention, the processes of the invention are carried out as depicted in FIG. 8. In FIG. 8, a ferrous scrap 1 is first provided from any known source. Examples of such sources include end-of life vehicles, steel plants, and home appliances. The ferrous scrap 1 contains steel, copper, and may contain other impurities. The ferrous scrap will typically contain from about 3 to about 5 wt % Cu.

The ferrous scrap 1 is then oxidized to form an oxidized scrap material 2. Any oxidation process 101 known in the art which converts the ferrous scrap to the oxidized scrap can be used in the invention. In one aspect of the invention, the oxidation process is conducted at a temperature and for a time sufficient to oxidize the desired amount of copper while minimizing the amount of other components (i.e., steel) that are oxidized. Generally, the oxidation is performed at a temperature ranging from about 400 to about 900° C. In one aspect of the invention, the oxidation is performed at a temperature ranging from about 400 to about 700° C. and for a time ranging from about 4 to about 6 hours.

The oxidation can be carried out in any suitable oxidizing atmosphere known in the art. In one aspect of the invention, the oxidation process is conducted in an atmosphere that oxidizes the desired amount of copper while minimizing the amount of other components (i.e., steel) that are oxidized. In one aspect of the invention, the oxidizing atmosphere comprises oxygen (air or $O_2$) any optionally contains inert components (e.g., Ar). In another aspect of the invention, the oxidizing atmosphere in the invention is air.

Figure 1:
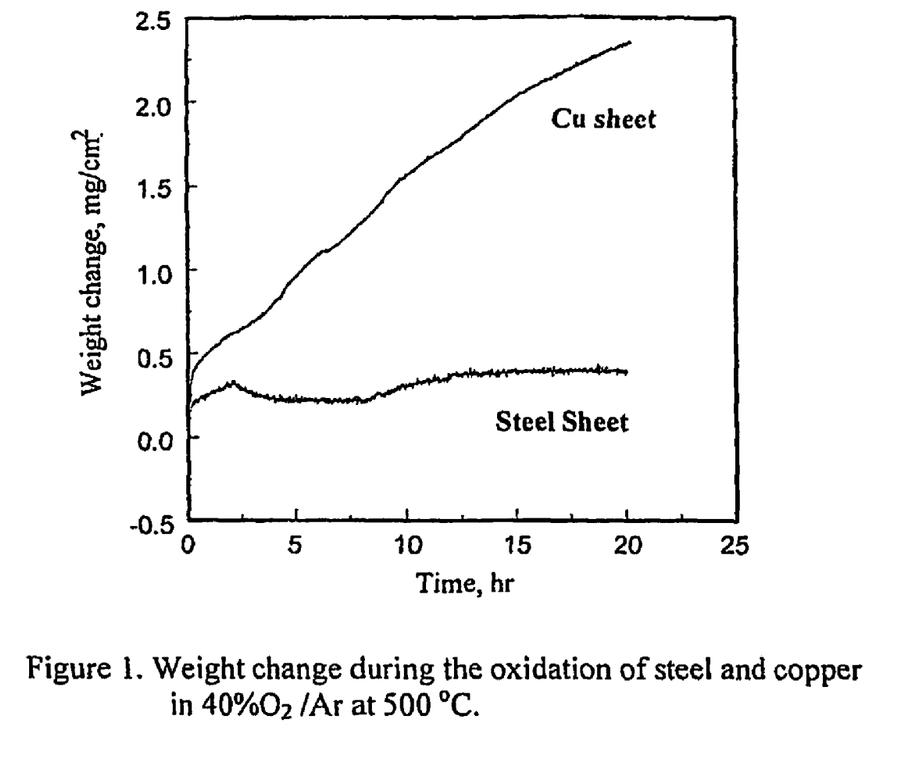
FIG. 1 illustrates the weight change of copper and steel during the oxidation under isothermal conditions.

In one aspect of the invention, the oxidation 101 of the ferrous scrap 1 was conducted in atmosphere containing 40 vol % oxygen and 60 vol % Ar at a temperature of about 500° C. FIG. 1 shows the weight change of copper and steel under these conditions. While copper gains a large amount of weight due to the formation of copper oxide, the weight of steel increases only slightly presumably because the oxidation rate of copper is much faster than that of steel.

The temperature of about 500° C. was used to minimize or prevent the formation of wustite (FeO) on the steel. Once the wustite starts to form, the oxidation rate of steel increases since the wustite is cation-deficient, defeating the purpose of oxidation process 101 to minimize the oxidation of steel in the ferrous scrap.

Figure 3:
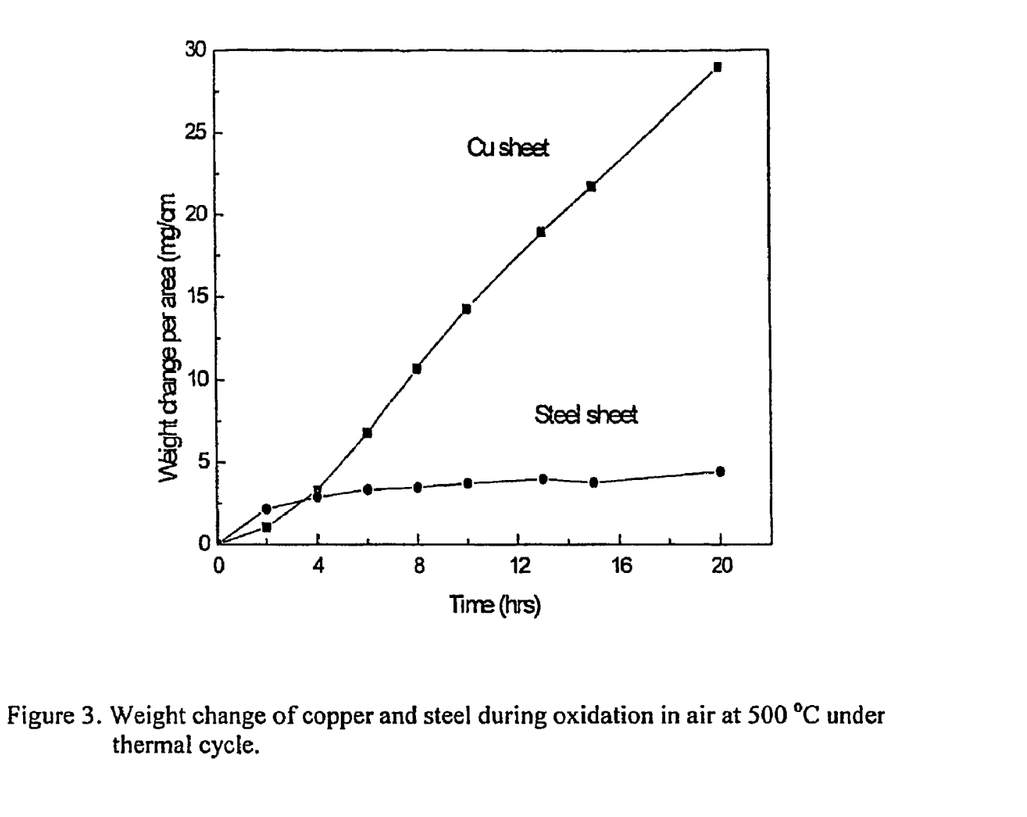
FIG. 3 illustrates the weight change of copper and steel during oxidation in air at 500 degrees Celsius under a thermal cycle in one aspect of the invention.

In one aspect of the invention, the oxidation can be performed under thermal cycle conditions. FIG. 3 shows the weight change during the oxidation of copper and steel in air at 500° C. under the thermal cycle conditions. The weight increase of copper is almost linear and more than ten times that exhibited under isothermal conditions. As well, the weight of the steel remains almost constant after initial weight gain under thermal cycle conditions. This increase oxidation rate presumably occurs because of the continuous exposure of copper substrate due to the spallation of copper oxide under the thermal cycle.

Figure 4:
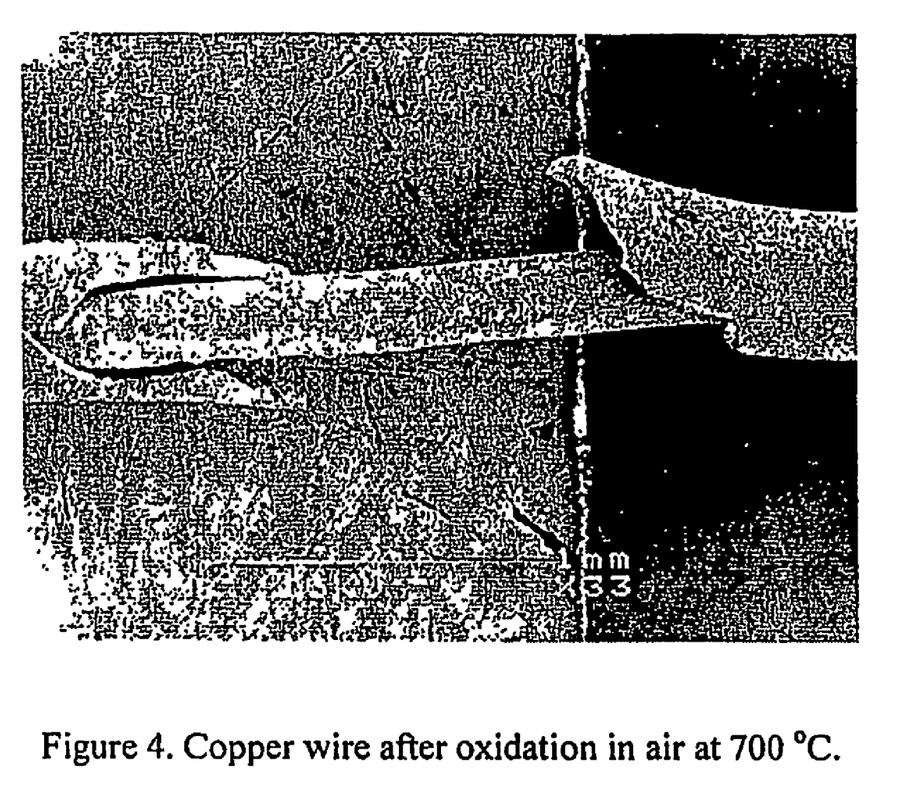
FIG. 4 is a SEM micrograph showing 1 mm diameter copper wire after being oxidized.

This spallation presumably occurs because the copper oxide is mechanically unstable, presumably due to the difference of linear thermal expansion coefficient between copper oxide and the underlying pure copper. The differences in the thermal expansion coefficients between a metal (i.e., copper) and the oxide (i.e., copper oxide) typically indicates the likely adhesion of the oxide scale and the protective nature of the oxide. For example, while scales of NiO and $Fe_2O_3$ on their respective metals seldom rupture or crack when cooled after oxidation, $Cu_2O$ scale cracks upon rapid cooling due to the difference between the thermal expansion coefficients of copper and copper oxide (as shown in FIG. 4, which is a SEM micrograph showing 1 mm diameter copper wire after oxidation for 2 hrs in air at 700° C.). With a higher thermal expansion coefficient in the underlying metal, compressive stresses develop in the oxide scale during cooling. The copper oxide therefore breaks down and becomes separated from the underlying copper. Thus, the ratio of the thermal expansion coefficient of copper to that of copper oxide leads to crack or rupture of the oxide scale, ensuring rapid reaction under the thermal cycle condition. Because iron and iron oxide do not have such a large differential, iron oxide is more protective than copper oxide.

The temperature, time, and atmosphere for the oxidation process will also depend on the exact make-up of the ferrous scrap. For example, if the steel contains minor elements (like Cr or Mo), the difference in oxidation rate between the copper and the steel can be even greater. The temperature, time, and atmosphere for the oxidation process would be modified accordingly.

After the oxidation, the oxidized scrap material 2 was analyzed and was found to exhibit the following properties. First, it was found that copper oxide (both $Cu_2O$ and CuO) were formed on the surface of the copper and iron oxide (both $Fe_2O_3$ and $Fe_3O_4$) were formed on the surface of the steel at the oxidizing conditions.

Figure 2:
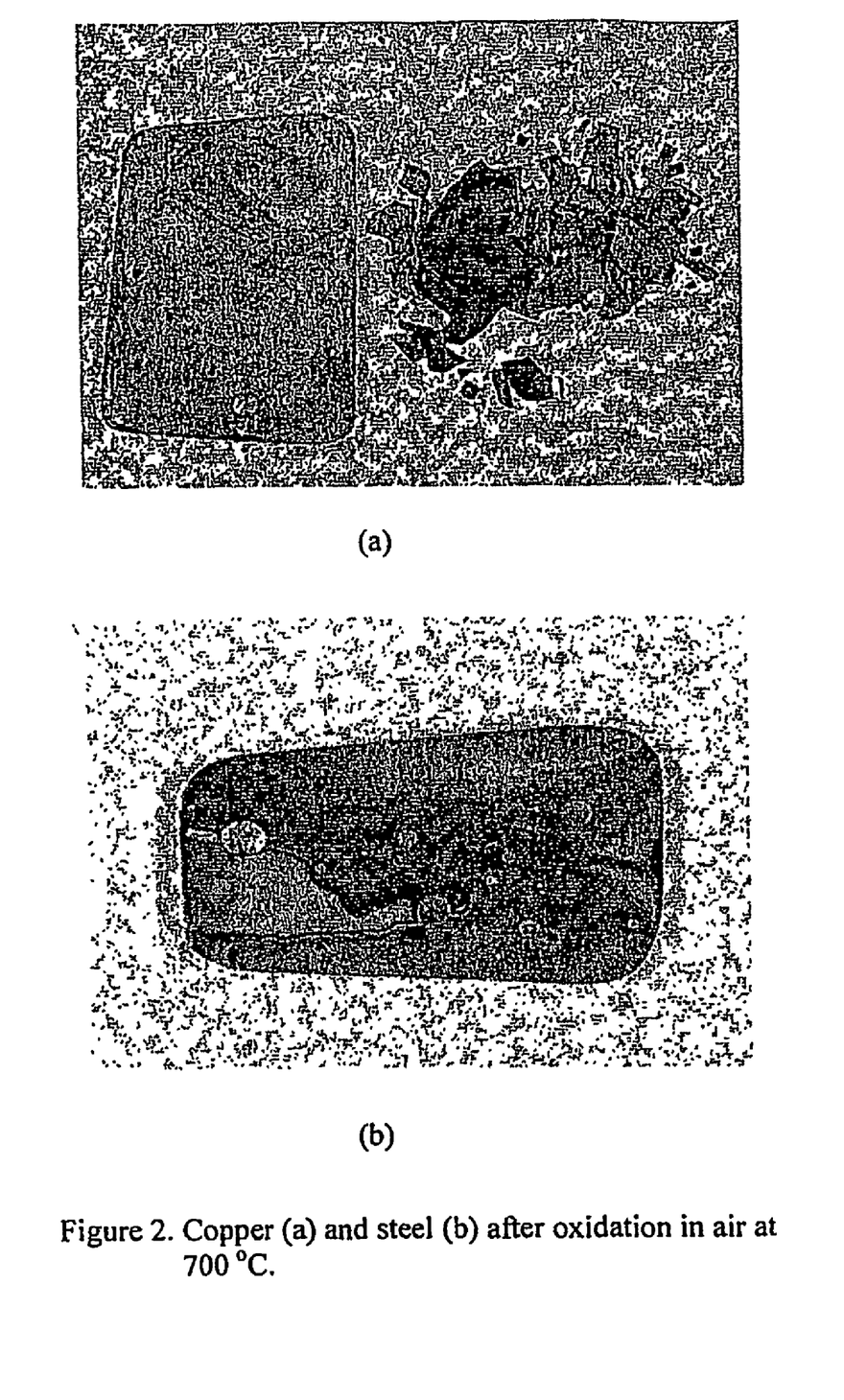
FIGS. 2a and 2b are optical micrographs showing a copper and steel specimen, respectively after oxidation followed by slight impact.

Second, the surface of the oxidized scrap was examined by optical and scanning electron microscopes. Cracks were observed on the surface of copper oxide but not on the iron oxide. Based on this observation, the copper oxide can be spalled and separated from the underlying copper after slight impact. But the iron oxide could not be spalled and separated as easy since it was more adherent to the underlying steel for the reasons described above. FIGS. 2(a) and (b) are optical micrographs depicting the copper and steel specimen, respectively, after oxidation followed by slight impact.

Most ferrous scrap, such as that obtained from a scrap yard, is already rusted and therefore covered with a thin iron oxide film. Thus, the loss of iron by the oxidation of scrap is expected to be minimal. On the other hand, copper will be continuously oxidized because of spallation of the oxide layer and therefore the oxidation of copper will be even faster under the cyclic oxidation conditions.

Thus, the copper present in the ferrous scrap 1 can be converted into copper oxide without much oxidation of the steel. Generally, the loss of iron (via oxidation) during oxidation of the copper can range up to about 1 wt %. In one aspect of the invention, the loss of iron by the oxidation of scrap can range from about 0.5 to about 1 wt %.

In the second step in the aspect of the invention illustrated in FIG. 8, the oxidized scrap 2 is subjected to an impacting process 102. While the oxidized scrap 2 from the first step of the process illustrated in FIG. 8 can be used in the invention, other oxidized scraps from other sources can also be used in place of oxidized scrap 2.

Any impacting process that removes a portion of copper oxide from the oxidized scrap 2 can be used in the invention. In one aspect of the invention, a mechanical impacting process is used in the invention. Examples of mechanical impacting process include tapping and shaking.

The result of the impacting process 102 produces a partially-purified scrap material 3 containing less amount of copper. Since some of the copper has been removed, the amount of copper in the partially-purified scrap will be relatively smaller than the amount of copper contained in the oxidized scrap and the initial ferrous scrap.

In one aspect of the invention, and as illustrated in FIG. 8, the partially-purified scrap 3 is subjected to a flux process 201 to produce purified slag 4 containing less than 0.5 wt % copper. The flux process 201 is typically performed below the melting point of any steel so the steel remains as a solid. Generally, the temperature of the fluxing process can range from about 700 to about 1300° C. In one aspect of the invention, the temperature of the fluxing process can range from about 1000 to about 1200° C. The fluxing process 201 generally is performed for a time sufficient to dissolve the copper oxide into the molten slag based on $CaO$—$SiO_2$—$B_2O_3$ and $Na_2O$—$SiO_2$—$B_2O_3$.

In one aspect of the invention, an electric arc furnace (EAF) slag is used as the fluxing agent. In this process, the EAF slag has been modified by the addition of additives that lower the melting point of the EAF slag. EAF slag contains a fair amount of CaO and $SiO_2$ (and similar oxides) that raise the melting point. By lowering the melting point with the additives such as $B_2O_3$ and $CaF_2$, the fluxing process can be carried out at a lower temperature.

Any additive that lowers the melting point can be used in the invention, such as $B_2O_3$, $CaF_2$, $Na_2O$, or combinations thereof. In one aspect of the invention, the additive is boron oxide ($B_2O_3$), which is cheap and easily available. In another aspect of the invention, this additive is $CaF_2$ since is can further lower the melting point and viscosity.

Figure 5:
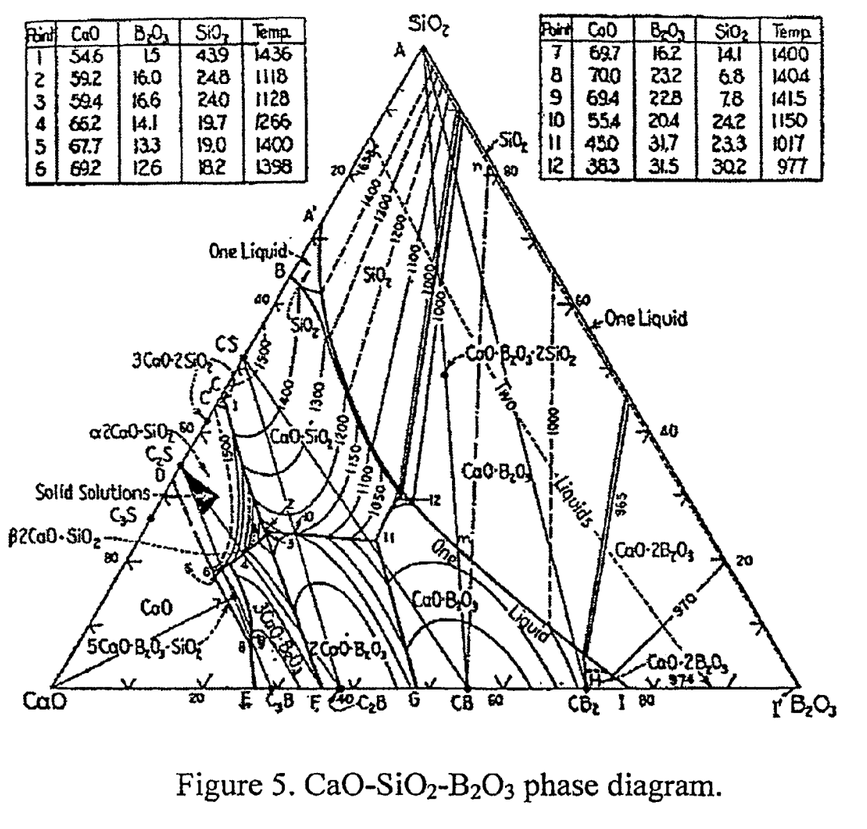
FIG. 5 illustrates a phase diagram for a ternary oxide mixture used in one aspect of the invention.

As indicated in the phase diagram shown in FIG. 5, the melting point of the slag can be as low as from about 970 to about 1100° C. by using such additives. In one aspect of the invention, the melting point can be lowered to about 970° C. by using such additives. Thus, the copper oxide present in the oxidized scrap can be melted without melting the scrap by fluxing using the low melting point fluxes containing such additives.

The amount of the additive depends on physical and chemical properties of the fluxes, as well as the amount needed to lower the melting point to the desired range. Generally, the amount of the additives can range up to about 30 wt %. In one aspect of the invention, the amount of the additives can range from about 5 to about 15 wt %.

Figure 6:
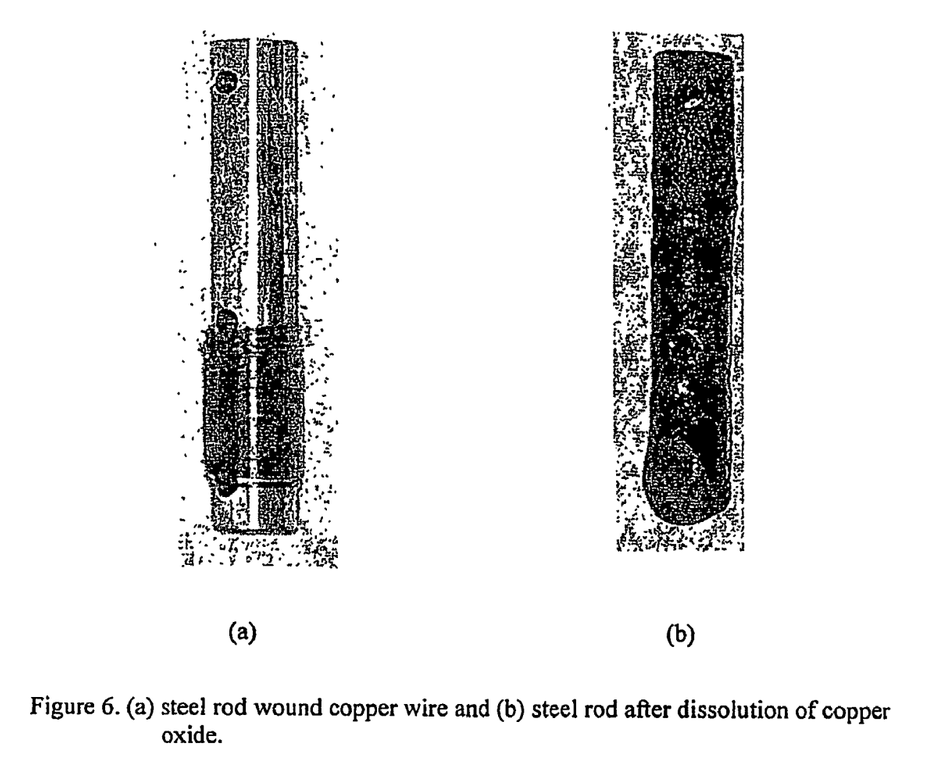
FIG. 6a illustrates two layers of copper wire of 0.5 mm diameter wound on a solid steel rod and oxidized.
FIG. 6b shows the steel rod of FIG. 6a after being immersed in the slag for 100 min at 1200° C.

To exemplify this fluxing process, two layers of copper wire of 0.5 mm diameter was wound on a solid steel rod as shown in FIG. 6(a) and oxidized completely at 700° C. The steel rod wound with oxidized copper wire was immersed in the static molten slag of 59.5% CaO-16.5% $SiO_2$-24% $B_2O_3$ at 1200° C. for the dissolution of copper wire. After the fluxing, the solid rod was removed from the molten slag and the copper winding was examined. FIG. 6(b) shows the steel rod after being immersed in the slag for 100 min at 1200° C., which shows almost all of the copper winding is removed from the steel rod.

The materials removed in this process (copper oxide, $SiO_2$, and CaO and other impurities) can then further be process and purified for use of the various components. For example, the cupper could be recovered and used as a copper material for any known end-use, i.e., copper wires.

The purified steel that is removed generally contains less than about 0.5 wt % Cu. In one aspect of the invention, the Cu content is generally less than about 0.3 wt %. In yet another aspect of the invention, the Cu content is generally less than about 0.1 wt %. In still another aspect of the invention, the Cu content is generally less than about 0.05 wt %. The purified steel can then be used for any end use corresponding with the amount of Cu in the steel. For example, the purified steel containing less than about 0.5 wt % copper can be used in rebar, the purified steel containing less than about 0.1 wt % copper can be used in high-quality steels, and the purified steel containing less than about 0.05 wt % copper can be used in deep drawing steels.

Thus, the copper oxide in the partially-purified scrap 3 is dissolved into a molten slag in a single-step process. The fluxing process creates a molten slag that contains copper oxide, $SiO_2$, and CaO and other impurities. The fluxing process is performed so that this molten slag is then sloughed off and removed, leaving the purified steel.

While the process illustrated in FIG. 8 shows a sequential process, each of the individual stages of the process could be performed separately. For example, the mechanical impact 102 stage could be performed on an oxidized scrap other than that obtained from oxidation stage 101. Likewise, the fluxing process 201 could be performed on a partially-purified scrap other than that obtained from impacting process 102.

The invention is further illustrated by the following non-limiting example.

EXAMPLE

Coupon specimens for copper and steel were prepared for the oxidation experiments. A big piece of steel was obtained from the body of a car in a junk yard and the piece was cut to create smaller specimens for the oxidation tests. The coupon specimens were abraded and polished, and then degreased and cleaned in an ultrasonic cleaner. The experimental apparatus used for the oxidation tests were described in Gilsoo Han and W. D. Cho, "High-Temperature Corrosion of $Fe_3Al$ in 1% $Cl_2$/Ar," *Oxidation of Metals*, Vol. 58, 2002, p. 391, and contained a computer-controlled microbalance, a kanthal-wound furnace, gas train and mixing chambers of reagent gases.

The specimen was loaded with Pt-wire (0.02 inch diameter) inside a fused quartz reaction tube. The purified argon gas flow was maintained until the desired temperature was obtained. After the temperature of furnace reached the reaction temperature and was stable under the argon atmosphere, a $O_2$—Ar gas mixture was introduced into the reaction tube at a flow rate of 100 ml/min, superficial flow rate of ~1 cm/s. From this point, the weight change of the specimen was measured using an electrobalance (D101 Cahn Balance) which had a 1 µg sensitivity. After the predetermined reaction time, the specimens were cooled in the furnace and removed in order to examine the oxidized specimen. The characterization of corrosion products was made by XRD (X-ray Diffraction), SEM (Scanning Electron Microscopy) and EDS (Energy Dispersive Spectrometer).

For the dissolution of copper oxide in molten slag, copper wire wound on a steel rod was oxidized completely in air and subsequently the steel rod was immersed in static molten slag. The resistance-heated furnace that can attain up to 1700° C. was heated by platinum-rhodium alloy windings and the temperature of the furnace was controlled by a B-type thermocouple as described in W. D. Cho and Peng Fan, "Diffusional Dissolution of Alumina in Various Steelmaking Slags," *ISIJ International*, Vol. 44, pp. 229-234, 2004.

A powder mixture of the slag components was then charged in an alumina crucible which was placed into an alumina tube. After melting the powders completely, the steel rod wound with oxidized copper wire was immersed in the molten slag and withdrawn after a predetermined time period.

In addition to any previously indicated variation, numerous other modifications and alternative arrangements may be devised by those skilled in the art without departing from the spirit and scope of the invention and appended claims are intended to cover such modifications and arrangements.

Thus, while the invention has been described above with particularity and detail in connection with what is presently deemed to be the most practical and preferred aspects of the invention, it will be apparent to those of ordinary skill in the art that numerous modifications, including but not limited to, form, function, manner of operation and use may be made without departing from the principles and concepts set forth herein.

What is claimed is:

1. A method of removing copper from ferrous scrap, comprising:
providing a ferrous scrap containing copper;
converting the copper in the ferrous scrap to a copper oxide; and
dissolving the copper oxide into a molten slag by removing about 90 wt % to less than about 100 wt % of the copper in the scrap.

2. The method of claim 1, further comprising removing from about 99.5 wt % to about 99.9 wt % of the total copper.

3. A method for removing copper from ferrous scrap, comprising:
providing a ferrous scrap containing copper;
oxidizing the copper in the ferrous scrap at a rate higher than the oxidation rate of the remainder of the scrap, wherein the oxidation is performed at a temperature ranging from about 400 to about 700° C. and for a time ranging from about 4 to about 6 hours; and
impacting the oxidized scrap.

4. A method for removing copper from ferrous scrap, comprising:
providing a ferrous scrap containing copper;
oxidizing the copper in the ferrous scrap at a rate higher than the oxidation rate of the remainder of the scrap;
impacting the oxidized scrap;
fluxing the oxidized scrap after it is impacted using a slag selected from the group consisting of $Na_2O$—$B_2O_3$—$SiO_2$-based slags, a modified electric arc furnace slag based on $CaO$—$SiO_2$—$B_2O_3$, and combinations thereof at temperatures below the melting point of steel, wherein the melting point of the slag is lowered by mixing an additive with the slag.

5. The method of claim 4, further comprising separating a copper-containing slag portion from the ferrous portion created by the fluxing process.

6. The method of claim 5, wherein the separation is performed by a metallurgical process.

7. The method of claim 4, wherein the impacting is performed by tapping or shaking.

8. The method of claim 4, wherein the additive comprises $B_2O_3$, $CaF_2$, $Na_2O$ or a combination thereof.

9. The method of claim 8, wherein the amount of additives ranges up to about 30 wt %.

10. The method of claim 9, wherein the amount of additives ranges from about 5 to about 15 wt %.

11. The method of claim 4, wherein the fluxing process both creates an upper portion containing copper and a lower portion containing steel and then removing the upper portion by sloughing.

12. The method of claim 4, further comprising removing about 90 wt % to less than about 100 wt % of the copper in the ferrous scrap.

13. The method of claim 4, further comprising removing from about 99.5 wt % to about 99.9 wt % of the copper in the ferrous scrap.

* * * * *